No. 692,411. Patented Feb. 4, 1902.
E. L. APPLEBY.
REVOLVING PHONOGRAPH RECORD CASE.
(Application filed Apr. 17, 1901.)
(No Model.) 2 Sheets—Sheet I.
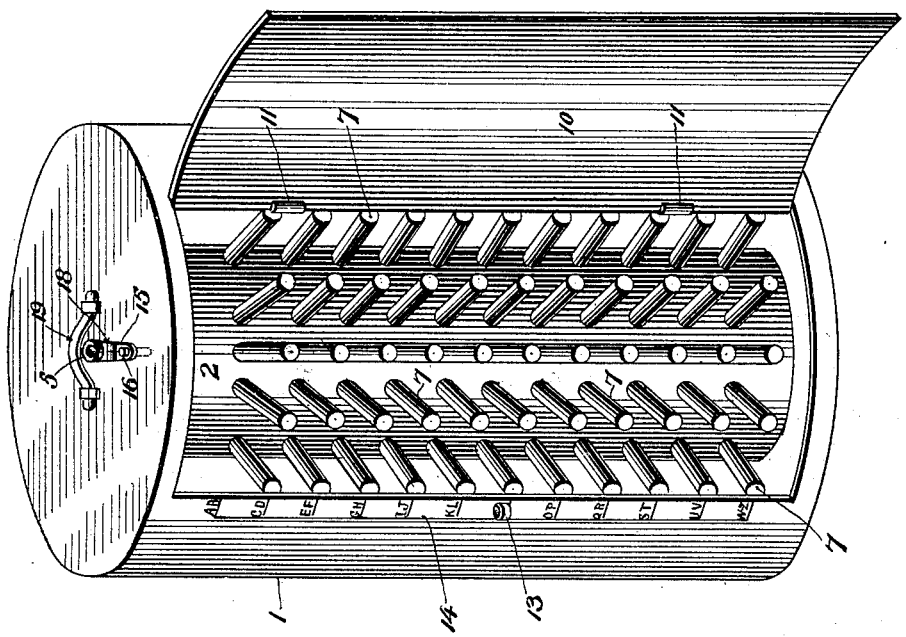
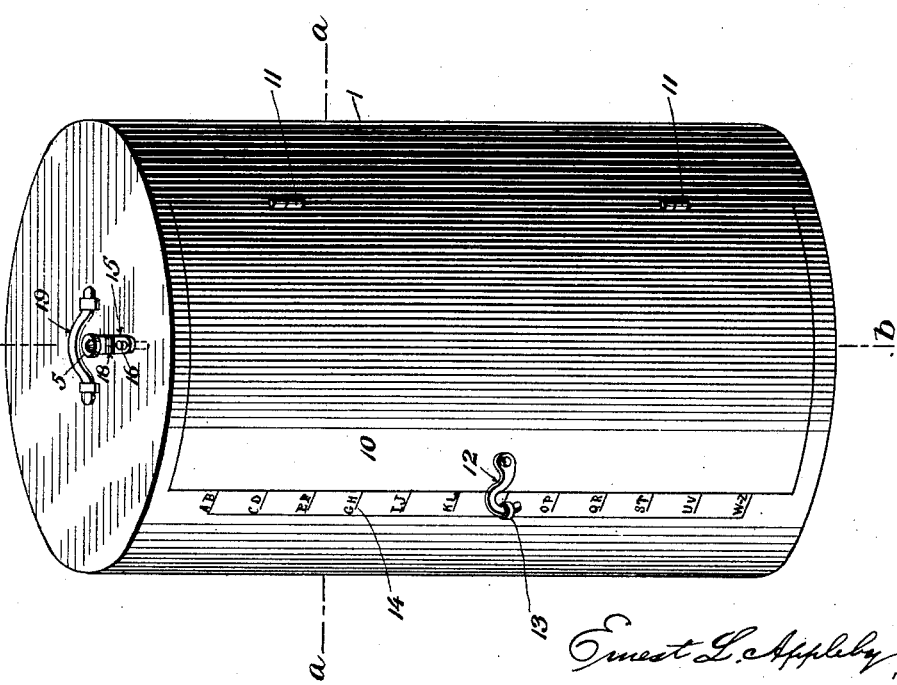
Witnesses
Ernest L. Appleby,
Inventor
by
Attorney
THE NORRIS PETERS CO., PHOTO-LITHO., WASHINGTON, D. C.

No. 692,411. Patented Feb. 4, 1902.
E. L. APPLEBY.
REVOLVING PHONOGRAPH RECORD CASE.
(Application filed Apr. 17, 1901.)
(No Model.) 2 Sheets—Sheet 2.
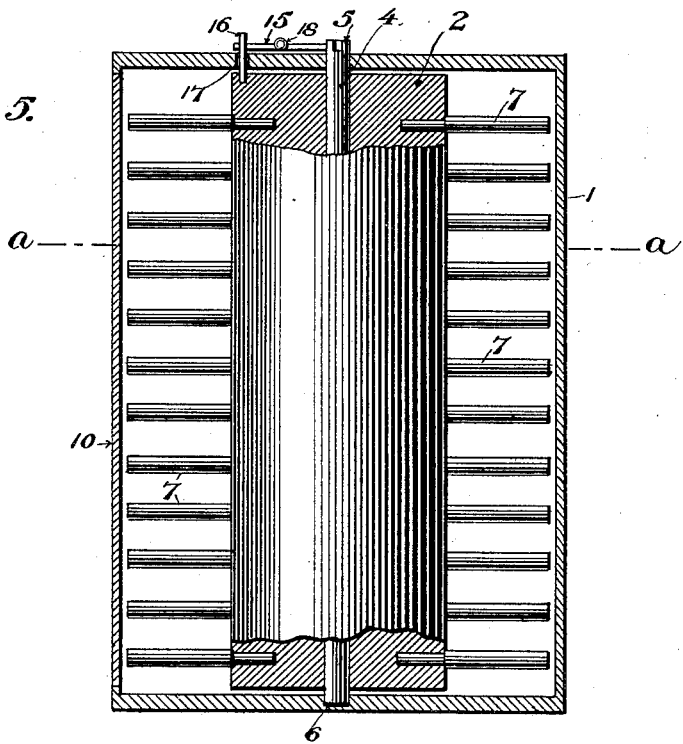
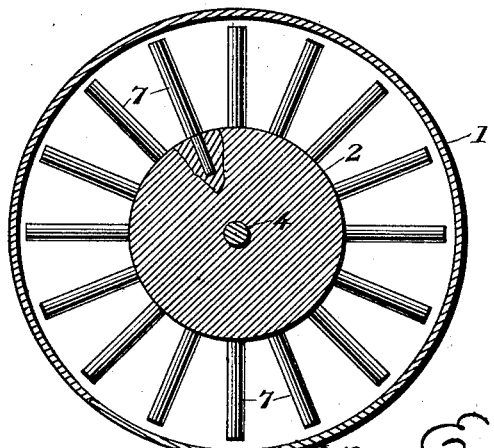
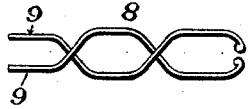

UNITED STATES PATENT OFFICE.

ERNEST LEVERN APPLEBY, OF BRADFORD, PENNSYLVANIA.

REVOLVING PHONOGRAPH-RECORD CASE.

SPECIFICATION forming part of Letters Patent No. 692,411, dated February 4, 1902.

Application filed April 17, 1901. Serial No. 56,266. (No model.)

*To all whom it may concern:*

Be it known that I, ERNEST LEVERN APPLEBY, a citizen of the United States, residing at Bradford, in the county of McKean and State of Pennsylvania, have invented certain new and useful Improvements in Revolving Phonograph-Record Cases, of which the following is a specification, reference being had therein to the accompanying drawings.

My invention relates to phonograph-record holders or cases, and has for its object to produce a device of this character in which phonograph or other like records may be conveniently and systematically stored for preservation and in which they may be transported from place to place without danger of becoming marred or otherwise damaged.

To this end the invention consists, primarily, of an outer case or covering, a drum or core mounted therein, and a plurality of record-supporting devices carried by said drum and adapted to receive the records and maintain them out of contact one with another.

The invention further consists in the details of construction more fully hereinafter described.

In the accompanying drawings, Figure 1 is a perspective view of the device closed. Fig. 2 is a similar view of the device opened. Fig. 3 is a cross-section on the line $a\ a$ of Fig. 1. Fig. 4 is a view of a modified form of record-supporting device. Fig. 5 is a longitudinal section on the line $b\ b$ of Fig. 1.

Referring to the drawings, 1 represents the outer case or covering proper, composed of leather or other suitable material and preferably of a cylindrical form in cross-section.

2 is an inner drum or core, preferably also of cylindrical form and composed of any suitable materal, mounted centrally in the case 1 on a vertical axis and adapted to be manually rotated on its axis to gain access to any of the various records. The axis on which the drum is mounted to revolve comprises a metallic rod 4, extending centrally therethrough and projecting at the respective ends of the drum to form journals 5 and 6, which are journaled in the ends of the outer case 1. The drum is provided with a plurality of radially-projecting supporting-spindles 7, attached to the drum by driving their inner ends into suitable sockets formed in the drum. These spindles are arranged in linear rows around the drum and are each adapted to receive and carry a phonograph-record, the spindles being so spaced as to prevent the records contacting one with another. Instead of the spindles I may provide the drum with spring-fingers 8, as illustrated in Fig. 4, to receive and hold the records. These fingers 8 each comprise two pieces of spring-wire or the like bent into form, as shown, and having their inner ends 9 bradded into the drum. These spring-fingers will when a record is in place thereon hold it with a yielding pressure, which maintains it firmly in place, but admits of its ready removal.

To admit of access being had to the inner drum, the case 1 is provided with a suitable door 10, extending nearly the full length thereof, mounted on hinges 11 and provided with a fastening device comprising a hook 12 and staple 13, by which it may be secured when closed.

The case is provided on its outside adjacent to the edge of the door and parallel therewith with a suitable index 14, provided with suitable designating-ordinals opposite the respective rows of records for facilitating the ready location of any desired record.

To prevent the rotation of the inner drum when not in use, I provide a suitable locking device comprising a flat metallic plate 15, secured at one end to the journal 5 and at its opposite end provided with a vertical finger 16, passing through a hole 17 in the top of the case 1 and for engagement with a suitable notch or hole in the end of the drum. The plate 15 is hinged at its center, as at 18, to permit its pin end being turned back out of engagement with the drum.

The case 1 is provided with a suitable handle 19, by which it may be readily transported from place to place.

It is to be understood that I do not limit or confine myself to the precise details herein described, as various changes, such as would suggest themselves to the skilled mechanic, may be made without departing from the limits or scope of my invention.

Having thus described my invention, what I claim is—

1. In a phonograph-record holder or case, the combination with the outer case or covering, of a drum mounted therein and a plurality of record-supporting devices carried by said drum and a locking device comprising a hinged arm mounted on one of the journals of the drum and having means to engage the inner drum to prevent its rotation.

2. In a phonograph-record holder or case, the combination with the outer case or covering, of a drum rotatably mounted therein, and a plurality of record-supporting devices carried by said drum and adapted to maintain the record out of contact one with another and a locking device comprising a hinged arm mounted on one of the journals of the drum and having means to engage the inner drum to prevent its rotation.

3. In a phonograph-record holder or case, the combination with the outer case or covering, of an inner rotatable drum, a rod extending concentrically through said drum and journaling it to the case, and a plurality of radially-extending record-supporting devices carried by said drum and a locking device comprising a hinged arm mounted on one of the journals of the drum and having means to engage the inner drum to prevent its rotation.

4. In a phonograph-record holder or case, the combination with the outer case or cover provided with a record-index, of an inner rotatable drum journaled therein, a plurality of record-supporting devices carried by the drum and a device for locking the drum against rotation mounted on the journal of the inner drum and hinged between its ends.

5. In a phonograph-record holder or case, the combination with the outer case or cover, of a rotatable drum journaled therein, a plurality of record-supporting devices carried by the drum, a door in the outer case admitting access to its interior and an index carried by the outer case adjacent to the door for designating the contained records.

In testimony whereof I affix my signature in presence of two witnesses.

ERNEST LEVERN APPLEBY.

Witnesses:
E. F. SHELDON,
F. V. B. SWITZER.